United States Patent Office 3,090,856
Patented May 21, 1963

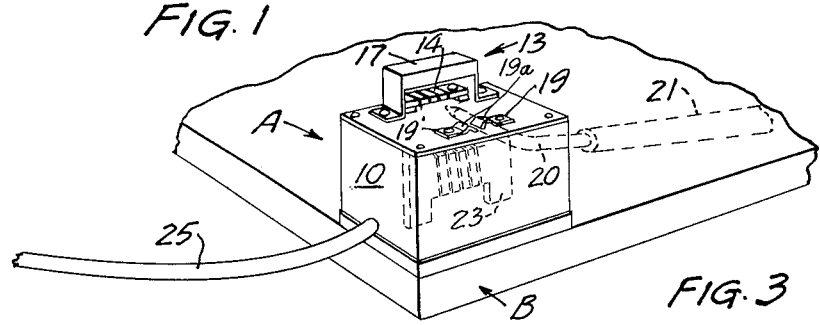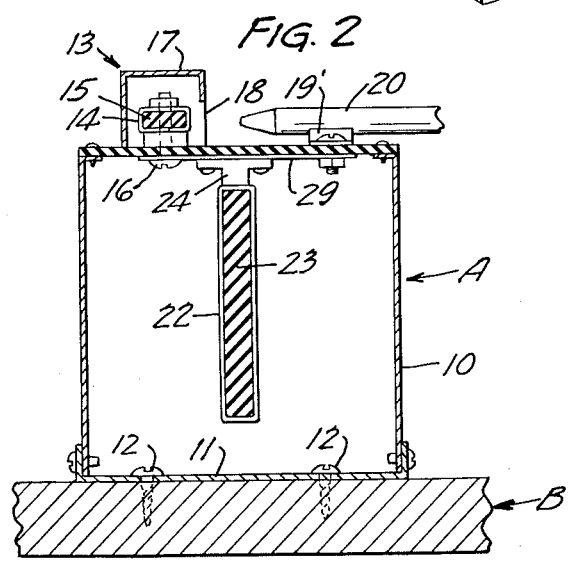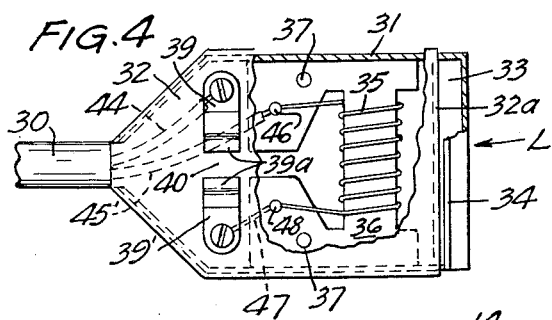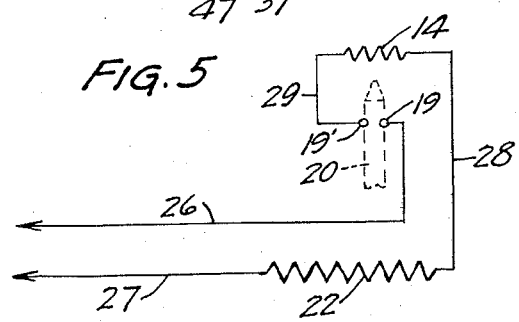

3,090,856
GAS TORCH LIGHTER
Hjalmer Rorvig, 342 Fillmore St. NE.,
Minneapolis, Minn.
Filed Oct. 13, 1959, Ser. No. 846,082
3 Claims. (Cl. 219—32)

This invention relates to a torch lighting device and in particular to a device for lighting gas torches employed in welding, cutting, soldering and the like.

The most common means of lighting conventional gas torches for use in welding, cutting, soldering and the like presently available are flint lighters in which the operator must strike a spark with the flint while holding the torch close to said flint to ignite the same. These flint lighters are available in several forms but all of them have certain inherent disadvantages. These flint lighters are sometimes difficult to operate and the operator is not always able to quickly strike a sufficient spark to enable him to quickly light his torch. In addition, the operator must handle both the torch and the flint lighter at the same time, which is awkward and inconvenient. Also, the flints wear out and must be frequently replaced and are frequently of a nature which renders them susceptible to easy misplacement or loss. In addition, the use of flint lighters normally requires that both hands of the operator be occupied which is highly undesirable in certain operations. Finally, one of the most important disadvantages of the flint lighters is the fact that they require the operator's hand to be positioned forwardly of the torch and in close proximity thereto at the time of lighting which frequently results in painful burning of the hand of the operator.

Therefore, an important object of my invention is a novel torch lighting device which is simple in design and inexpensive in construction and extremely easy to operate.

Another object is a torch lighting device of the class described which enables the operator to quickly light the torch by using only a single hand and which permits his other hand to be free for other purposes.

Still another object is a torch lighting device of the class described which is completely safe and eliminates the dangers and hazards particularly in regards to the burning of the operator's hand which are encountered in devices presently available.

Still another object is a torch lighter of the class described which is operated by electric current and may be continuously connected to a source thereof but which requires or actually uses the current only during the period of time necessary to ignite the torch.

Still another object is a torch lighting device of the class described which is readily available to the operator at all times and which permits the torch to be ignited simply by touching the torch thereto.

A further object is a torch lighter of the class described having a gas igniting element, heating of which is controlled by touching the lighter with the nozzle of the torch, which heating element is shielded from accidental engagement with the torch nozzle or fingers of the operator.

A still further object is a torch lighting device which permits the gas from the torch to be turned on only momentarily when the igniting element is heated to proper temperature to reduce the amount of waste gas dispersed into the room.

These and other objects and advantages of my invention will more fully appear from the following description made in connection with the accompanying drawings wherein like reference characters refer to the same or similar views, and in which:

FIG. 1 is a perspective view of a mounted form of my invention;

FIG. 2 is a vertical cross sectional view on an enlarged scale taken on the line 2—2 of FIG. 1;

FIG. 3 is a side elevational view in partial section of a portable manually operated form of my invention;

FIG. 4 is a detailed top plan view in partial section on an enlarged scale of the lighting head of the form of my invention shown in FIG. 3; and FIG. 5 is a wiring diagram of my invention.

Reference is now made to the drawings for a more detailed description of the torch lighting device of my invention. FIG. 1 illustrates one form of my invention in which my torch lighter indicated generally by the letter A is mounted on the corner of a supporting surface such as a work bench B. The torch lighter A comprises a suitable rectangular box or housing 10 having a detachable bottom 11 which provides access to the interior of the box 10. The box 10 may be permitted to rest freely on any suitable fastening means such as the screws 12. The box 10 has an igniting or heating unit 13 mounted on the top thereof. The igniting unit 13 includes a coil of high resistance wire 14 such as Nichrome which is wound about a suitably insulated mounting block 15 which is horizontally suspended above the top of the box 10 by means of a pair of electrically conductive mounting elements such as the screws 16, the entire unit being suitably insulated from the box 10. The coil 14 is preferably of a nature which will permit it to heat rapidly to gas igniting temperature upon the passage of electric current through it.

The igniting coil 14 is enclosed by a suitable hood 17 for confining the gas from the torch in the area immediately surrounding the igniting coil 14 to permit quick igniting or lighting thereof, the hood being provided with an openng 18 in the front face thereof to permit the gas from the torch to gain access to the interior thereof and to the igniting coil 14. The hood 17 is also preferably designed to function as a protective shield for the igniting coil 14 to prevent foreign elements such as the nozzle of the torch or the fingers of the operator's hand from coming in contact therewith.

A switch unit is also mounted atop the box 10 in front of the heating unit and preferably in substantial alignment therewith. This switch unit comprises a pair of similar leaf-like contact elements or circuit breakers 19 and 19', which contact elements 19 and 19' are disconnectibly disposed adjacent to one another in substantial alignment with each other and providing a gap therebetween. The opposing disconnected ends of the contact elements 19 and 19' are bent to provide a raised or upstanding convex portion 19a, the opposing convex portions 19a defining therebetween a valley or seat for receiving the tip or nozzle 20 of a gas torch 21 to bridge the gap and close the circuit. The valley or nozzle seat is preferably aligned with the heating coil 14 so that a nozzle 20 resting therein will be directed towards the coil 14 while closing the circuit to heat said coil.

A resistance unit including a coil of wire 22 wound about an insulating and mounting block 23 is mounted interiorly of the box 10 and in the form shown is suspended from the top thereof by means of suitable mounting brackets 24. The resistance unit, the switch and the heating element are electrically connected in series in any suitable fashion with a source of electrical current as by means of a conventional flexible electrical cable or cord 25 which may be provided at one end thereof with a suitable plug (not shown) for connection with any suitable source of electric current such as a typical wall outlet. The resistance coil 22 is designed to reduce the flow of current to the heating coil 14 to an amount which permits the coil 14 to be quickly heated to a gas igniting temperature but prevents an excessive amount of current from passing through said coils which would result in unnecessarily high temperatures and earlier failure of the coil. The wiring arrangement or electrical diagram for the lighter of my invention is best seen in FIG. 5 in diagrammatic form.

In the form shown, one of the contact or breaker elements 19 is connected to one of the lead lines 26 of the cable 25. The other lead line 27 of the cable 25 is connected to the resistance coil 22 which in turn is connected to the heating coil 14 by means of a line 28. The other contact element 19' is connected with the other end or side of the heating coil 14 by means of a conductor plate 29 which underlies the top of the box 10 and is best seen in FIG. 2.

In use and operation, the torch lighter A is mounted or placed in a location convenient to the operator and within easy reach thereof and is plugged into any suitable source of electrical current. Since the contact elements or circuit breakers 19 and 19' of the switch unit are disconnected from one another, the circuit of the lighter is normally in open or broken condition so that no current passes therethrough when the same is not in use. This prevents an unnecessary waste of electric current and also prevents the heating coil 14 from rapidly wearing out or deteriorating due to constant heating thereof. To light the torch, the operator simply rests the tip 20 of the gas torch 21 in the valley provided by the opposing convex ends of the contact elements 19 and 19' and in engagement with both of said elements to bridge the gap therebetween with the nozzle directed towards the heating unit and coil 14. The engagement of the tip of the torch with the contact elements closes the circuit of the torch lighter and causes the heating coil 14 to quickly and almost instantaneously heat to a high temperature sufficient to ignite the gas from the torch. As the heating coil 14 heats to a sufficient temperature, the operator simply turns on the gas which flows from the nozzle of the torch into the hood and against the heated coil 14 which immediately ignites the gas. The torch is then simply removed from contact with the circuit breaker points 19 and 19' which immediately breaks the circuit and causes the heating coil 14 to quickly cool to normal temperature.

The form of my invention shown in FIGS. 3 and 4 embodies the same principles involved in the above described form of my invention directed to the torch lighter A of FIGS. 1 and 2 in that it also employs a resistance unit, a heating or igniting unit and a normally open switch connected in electrical series with one another. However, the torch lighter C of FIGS. 3 and 4 is particularly designed as a portable unit which is readily grasped and manipulated by one hand of the operator and is particularly useful in lighting mechanized gas torches which are used for cutting purposes and which are normally mounted on a suitable jig or frame and not hand operated as is the conventional welding torch. However, it is to be understood and is also obvious that the portable form of my invention represented by the torch lighter C of FIGS. 3 and 4 is also readily capable of being used to light the conventional manually operated gas torch.

The portable form of my invention represented by the lighter C comprises a lighting head L which is provided with a readily graspable tubular handle H, the head and handle being rigidly interconnected by means of an elongate reduced tubular connecting element or member 30. The lighting head L comprises a somewhat flat rectangular housing 31 having a detachable cover portion 32. The cover 32 is slightly shorter in length than the remainder of the housing 31 to provide an opening 33 communicating with the interior of the housing 31, adjacent the front marginal edge of the housing. The leading edge of the cover 32 is provided with a downturned lip or flange 32a projecting into the interior of the housing 31. The front marginal edge of the housing is provided with an upstanding slightly rearwardly inclined baffle plate 34 which is adapted to direct the gas from the cutting torch through the opening 33 and into the interior of the housing 31. A heating coil 35 comparable to coil 14 is mounted on a suitable insulating block or frame 36, the cover 32 and frame 36 being secured or fastened to the housing 31 by means of the nut and screw units 37. The top and bottom surfaces of the housing 31 are provided with vents 38 disposed adjacent the heating coil 35 to permit the gas blown into the housing and against the heating coil 35 to escape therefrom. A pair of contact elements or circuit breaker points 39 and 39' which are identical to each other and to the contact elements 19 and 19' previously described for the torch lighter A of my invention, are mounted on the top of the cover 32 adjacent the rear end thereof, the raised portions 39a of the contact elements 39 and 39' providing a valley or seat 40 directed towards the baffle plate 34.

The tubular handle H is of a size which is readily grasped and held in the hand as shown in FIG. 3 and has disposed therewithin a resistance element or coil 41 wound about an insulated supporting frame 42.

The resistance, heating coil and switch unit are connected in series as described above and are connected to a suitable source of electric current by means of an electric cable or cord 43, which is connected to the rear end of the handle H. One of the lead lines 44 of the cable 43 extends directly through the handle and the tubular connecting member 30 to be connected directly to one of the contact elements 39. The other lead line 45 of the cable 43 is connected to one end of the coil 41. Lead 45' continues from the other end of the coil 41 through the tubular connecting member 30 to connect with one end of the heating coil 35 as at the terminal 46. The other end of the heating coil 35 is connected to the other contact element 39' by means of a connecting line 47 as at terminal 48. Thus, it can be seen that the wiring arrangement of the portable form of my invention set forth as the torch lighter C in FIGS. 3 and 4 is the same as the mounted model A and has the same wiring diagram as set forth in FIG. 5. In use and operation, the principle is the same as that previously described for model A of FIGS. 1 and 2 with the exception that in most circumstances the torch lighter is brought to the gas torch rather than bringing the gas torch to the lighter as in model A. Thus, most of the cutting torches are mounted on some mechanized means and normally with the torches or blow pipes 49 being directed downwardly, over a workpiece to be cut such as the metal plate 50. Thus, with this type of mechanized mounted cutting torch it is virtually impossible and impractical to bring the torch to the lighter and it is obvious that in most instances the most desirable manner of lighting the torches is to bring the lighter to the torch.

Thus, as illustrated in FIG. 3, the portable type of torch lighter of my invention is grasped in the hand and held downwardly so that the tip 51 of the blow pipe 49 can make contact with the switch elements 39 and 39' to bridge the gap therebetween and close the switch. In so doing, the tip of the torch is faced downwardly and towards the baffle plate 34 so that the gas therefrom will impinge against the baffle plate and be directed into the interior of the housing 31 through the opening 33. The bridging of the gap by the tip of the torch through engagement with the elements 39 and 39' causes the heating element or coil 35 to heat up almost immediately and to ignite the gas from the torch as it is directed thereagainst. As soon as the torch is lit, the torch lighter C is simply moved or swung away from the engagement with the blow pipe or torch 49. This movement causes disengagement of the tip with the contact elements and opens or breaks the circuit thereby permitting the heating element to quickly cool down and shut off the flow of current through the device.

From the foregoing, the advantages of my invention are readily apparent. Regardless of which form of my invention is used, a torch whether it is intended to be used for welding, soldering or for cutting is almost immediately and instantaneously ignited by simply making contact with the switch to close the circuit to heat the heating coil which immediaely ignites the gas from the torch and is shut off by simply removing the torch from contact with the switch unit. Thus, the operation of the torch lighter of my invention is simplicity itself. It further can be seen that the device is simple in design, very inexpensive in construction, very useful and highly efficient. The device may be permitted to be plugged in at all times since the normally open switch prevents the current from passing therethrough and yet permits the coil to be heated to igniting temperature almost instantaneously upon closing of the circuit by the torch tip making contact with the switch and bridging the gap provided by the circuit breakers thereof.

Both of the forms of torch lighting devices of my invention permit the torch to be ignited by use of one hand only and also permits the hand to be kept a safe distance away from the tip of the torch at the time of igniting thereof to insure against any burning of the hand. The lighter of my invention also has the advantage that the area need not be flooded with gas from the torch while attempting to light the same as in devices presently available. Thus, in the devices presently available. Thus, in the devices presently available the gas from the torch must be first turned on and maintained until such time as a sufficient spark is struck to ignite the same. In contrast, the device of my invention permits a minimum amount of gas to be employed in igniting the torch. Since the igniting coil of my device is preferably so designed and of such a nature as to heat to igniting temperature almost instantaneously upon the closing of the circuit by the torch nozzle, preferably within one second or less, a short charge of gas from the torch may be directed against the igniting coil as the torch contacts the switch or immediately thereafter, which charge is all that is needed to light the torch. This redudces the amount of wasted gas to a minimum, reduces the dangers of potential possible explosion and injury to the operator and reduces the volume of objectionable and irritating noxious gases in the vicinity of the operator.

It should also be noted that in some instances the igniting coil may be so designed as to enable the intermediate resistance coil to be dispensed without causing damage to or rapid burning out of the igniting coil.

It will, of course, be understood that various changes may be made in the form, details, arrangement and proportions of the various parts without departing from the scope of my invention.

What I claim is:
1. A manually operated portable gas torch lighter comprising a hollow body member mounted on one end of an elongate handle member, a gas igniting resistance element mounted within said body member which heats to gas igniting temperature when an electric current is passed therethrough, said body member having an opening therein adjacent said element for admitting gas into said member, outwardly extending baffle means mounted on said member adjacent one side of said opening for directing gas thereinto, and a normally open switch in electrical circuit with said resistance element, said switch comprising a pair of spaced apart disconnected contact elements mounted on the outside of said member on the other side of said opening generally opposite said baffle means, said contact elements being capable of being engaged and bridged by the nozzle of a gas torch to close said circuit and heat said resistance element, said contact elements being positioned relative to said opening whereby the tip of said nozzle is directed towards said baffle and opening when the nozzle is in circuit closing engagement with said contact elements, and means for connecting said electrical circuit with a source of electric current.

2. The gas torch lighter of claim 1, including vent means formed in said body member adjacent said resistance element for venting gas blown into said body member by said nozzle.

3. The gas torch lighter of claim 1, including a pair of opposed spaced apart walls disposed on opposite sides of said opening and extending inwardly of said body member in a direction opposite to said baffle means and generally transversely of the direction of travel of gas from said opening to said resistance element, said walls defining a passageway from said opening into said body member, one of said walls extending from the side of the body member which carries said baffle means to the opposite side thereof, the other wall being disposed between said opening and said resistance element and spaced from said opposite side of said body member to define therewith an opening for admitting gas from said passageway into that portion of the body member housing said resistance element.

References Cited in the file of this patent
UNITED STATES PATENTS

| | | |
|---|---|---|
| 549,152 | Pogue | Nov. 5, 1895 |
| 644,860 | Hubert | Mar. 6, 1900 |
| 874,357 | Dickens | Dec. 17, 1907 |
| 1,281,036 | Lofstrom | Oct. 8, 1918 |
| 1,410,176 | Garl | Mar. 21, 1922 |
| 1,530,914 | Roden | Mar. 24, 1925 |
| 1,549,397 | Whitley | Aug. 11, 1925 |
| 1,915,446 | Pressler | June 27, 1933 |
| 2,087,818 | Schreiber | July 20, 1937 |
| 2,092,218 | Kitsuda | Sept. 7, 1937 |
| 2,146,561 | Cady | Feb. 7, 1939 |
| 2,384,797 | Cerny et al. | Sept. 18, 1945 |
| 2,500,584 | Pierre et al. | Mar. 14, 1950 |
| 2,850,084 | Kunzler | Sept. 2, 1958 |

FOREIGN PATENTS

| | | |
|---|---|---|
| 1,183,510 | France | Jan. 26, 1959 |